(12) United States Patent
Wilson

(10) Patent No.: US 6,390,505 B1
(45) Date of Patent: May 21, 2002

(54) STEERING COLUMN ADJUSTMENT SYSTEM USING FORCE FEEDBACK SYSTEM

(75) Inventor: Erik C. Wilson, Fort Wayne, IN (US)

(73) Assignee: International Truck Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/553,004

(22) Filed: Apr. 19, 2000

(51) Int. Cl.[7] .................................................. B62D 1/18
(52) U.S. Cl. .......................................... 280/775; 74/493
(58) Field of Search ............................. 280/775; 74/493

(56) References Cited

U.S. PATENT DOCUMENTS

| | | | |
|---|---|---|---|
| 3,978,740 A | 9/1976 | Selzer | |
| 4,244,236 A | 1/1981 | Sylvester | |
| 4,449,419 A | 5/1984 | Bruguera | |
| 4,656,888 A | 4/1987 | Schmitz | |
| 5,035,446 A | * 7/1991 | Arvidsson | 280/775 |
| 5,259,264 A | 11/1993 | Bodin et al. | |
| 5,449,199 A | * 9/1995 | Heinrichs et al. | 280/775 |
| 5,606,891 A | 3/1997 | Tisell et al. | |
| 5,613,404 A | 3/1997 | Lykken et al. | |

* cited by examiner

Primary Examiner—Eric Culbreth
(74) Attorney, Agent, or Firm—Jeffrey P. Calfa; Neil T. Powell; Dennis Kelly Sullivan

(57) ABSTRACT

An automotive vehicle steering column (10) and adjustment system has a telescope adjustment mechanism for adjusting the fore-aft position of the steering wheel (12) to the driver of the vehicle and a tilt adjustment mechanism for adjusting steering wheel inclination. Each adjustment mechanism includes a respective motorized linear actuator (24, 26). A force feedback system operates the actuators and includes telescope and tilt sensors (42, 44) for sensing telescope and tilt adjustment forces externally applied to the steering wheel by the driver during adjustment of steering wheel position. A controller (40) is responsive to the sensors for operating the actuators to position the steering wheel in directions of adjustment corresponding to the directions of telescope and tilt forces applied by the driver. Adjustment motion stops when the externally applied forces causing the motion cease.

19 Claims, 1 Drawing Sheet

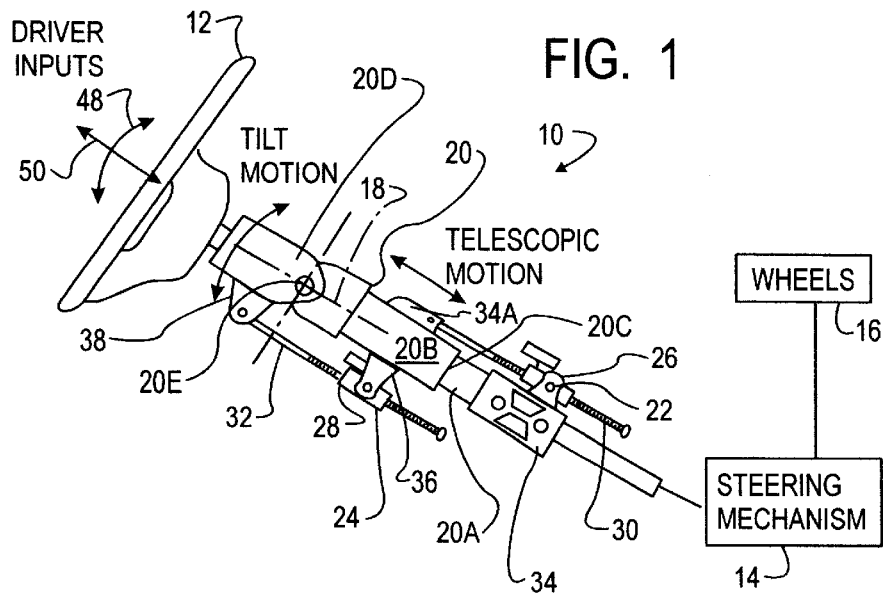
FIG. 1
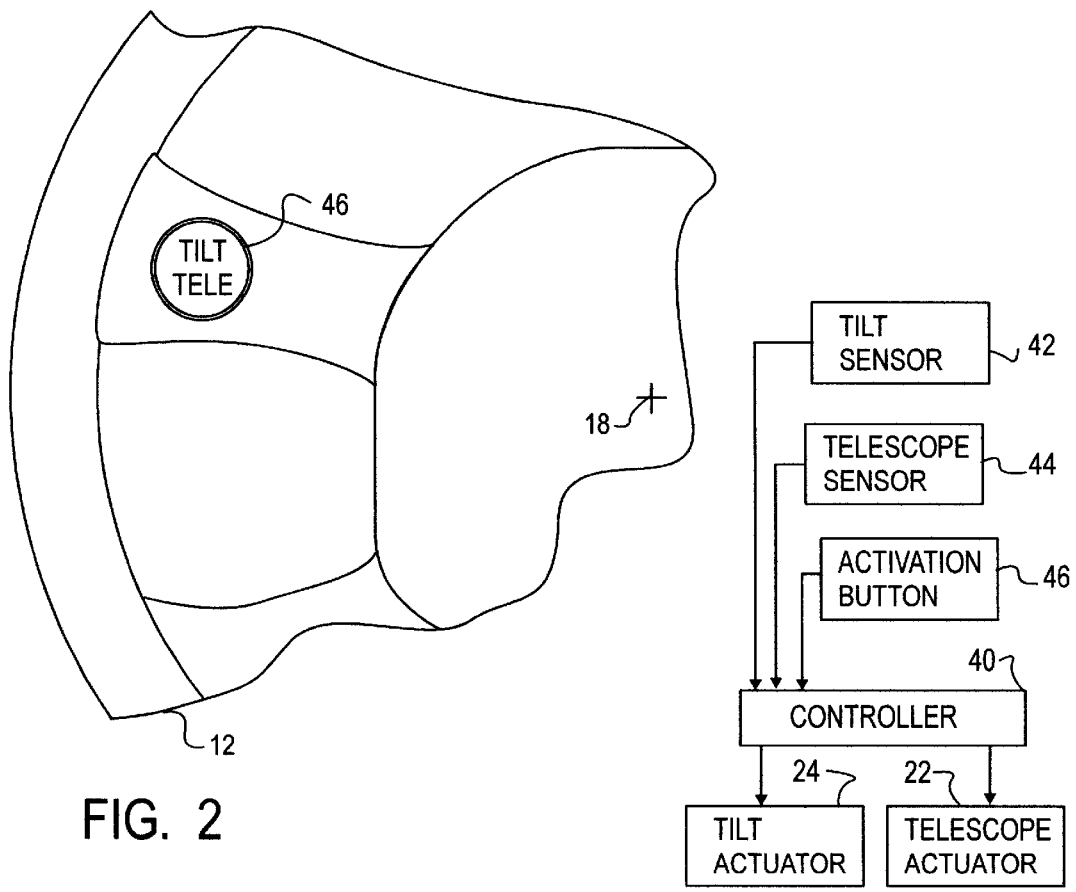
FIG. 2
FIG. 3

STEERING COLUMN ADJUSTMENT SYSTEM USING FORCE FEEDBACK SYSTEM

FIELD OF THE INVENTION

This invention relates generally to automotive vehicles, and more particularly to adjustable steering columns of automotive vehicles.

BACKGROUND AND SUMMARY OF THE INVENTION

Automotive vehicles are steered by turning a steering wheel at one end of a steering column. Motion of the steering wheel is transmitted through the steering column to a steering mechanism to steer wheels of the vehicle.

Certain vehicles have adjustable steering columns that are adjustable over a range of positions and can be set by a driver of the vehicle to a position that the driver deems comfortable. Steering columns may also be moved out of the way to allow easier driver ingress and egress to and from a vehicle.

An adjustable steering column may have either, or both, a tilt adjustment and a telescope adjustment. Tilt adjustment allows the column to be pivoted about a generally horizontal, transverse axis to thereby adjust the angle of inclination of the steering wheel relative to the driver. Telescope adjustment allows the steering column to be displaced lengthwise, thereby moving the steering wheel generally in a fore-aft direction to position the steering wheel either farther from or closer to the driver.

Steering column adjustment can be performed by various means. One means is manual operation of a lever that is manipulated by one hand to unlock the adjustment mechanism while the steering wheel is grasped with the other hand and moved. When the wheel has been adjusted to a desired position, the lever is manipulated to lock the adjustment mechanism and thereby maintain the steering wheel in the desired position of adjustment. Other means include foot pedal operators that, while depressed, can unlock the adjustment mechanism to allow adjustment, and motorized adjusters that may include associated electronic controls. An advantage of a foot pedal operator for performing steering column adjustment is that the driver can place both hands on the steering wheel while positioning it to a desired position. An advantage of motorized adjustment is that adjustment can be performed by the convenience of manipulating an electric switch, or switches. Motorized adjusters may use linear actuators and incorporate memory features that allow a desired position of adjustment for a particular driver to be obtained by simply pushing a switch, or switches.

One aspect of the present invention relates to a new and unique steering column adjustment system that senses adjustment force applied to the steering wheel by the driver during adjustment and that operates an actuator to move the steering wheel in the direction of sensed adjustment force. When the driver has positioned the steering wheel in a desired position of adjustment, he ceases to apply further adjustment force, and so the actuator ceases further adjustment. The steering wheel remains in this position until once again adjusted. Adjustment is initiated by the driver actuating an activation input, such as by depressing a push-button switch.

The invention, in one general respect, may be considered to relate to an automotive vehicle steering column and adjustment system comprising a steering column, including a steering wheel whose motion is transmitted through the steering column to a steering mechanism to steer wheels of the vehicle, and an adjustment mechanism for adjusting the position of the steering wheel in a vehicle relative to a driver of the vehicle, including an actuator for performing the adjustment. A force feedback system for operating the actuator includes a sensor for sensing an adjustment force externally applied to the steering wheel by the driver during adjustment of the steering wheel position, and a controller that is responsive to the sensor for operating the actuator to position the steering wheel in a direction of adjustment corresponding to the direction of external force applied to the steering wheel by the driver.

In another general respect, the invention may be considered to relate to an automotive vehicle steering column and adjustment system comprising a steering column, including a steering wheel whose motion is transmitted through the steering column to a steering mechanism to steer wheels of the vehicle, and an adjustment mechanism for adjusting the position of the steering wheel in a vehicle relative to a driver of the vehicle, including an actuator for performing the adjustment. A system for operating the actuator includes a sensor for sensing an adjustment force externally applied to the steering wheel by a driver during adjustment of the steering wheel position, and a controller that is responsive to the sensor for causing the actuator to move the steering wheel in the direction of the externally applied force and to terminate further movement when the externally applied force causing the movement ceases.

In another general respect, the invention may be considered to relate to a system for adjusting the position of a steering wheel in an automotive vehicle comprising an adjustment mechanism for adjusting the position of the steering wheel in the vehicle relative to a driver of the vehicle, including an actuator for performing the adjustment. A force feedback system operates the actuator, and includes a sensor for sensing an adjustment force externally applied to the steering wheel by the driver during adjustment of the steering wheel position, and a controller that is responsive to the sensor for operating the actuator to position the steering wheel in a direction of adjustment corresponding to the direction of external force applied to the steering wheel by the driver.

In still another general respect, the invention may be considered to relate to a system for adjusting the position of a steering wheel in an automotive vehicle comprising an adjustment mechanism for adjusting the position of the steering wheel in a vehicle relative to a driver of the vehicle, including an actuator for performing the adjustment. A system operates the actuator, and includes a sensor for sensing an adjustment force externally applied to the steering wheel by the driver during adjustment of the steering wheel position, and a controller that is responsive to the sensor for causing the actuator to move the steering wheel in the direction of the externally applied force and to terminate further movement when the externally applied force causing the movement ceases.

In still another general respect, the invention may be considered to relate to an automotive vehicle steering column and adjustment system comprising a steering column, including a steering wheel whose motion is transmitted through successive steering shaft sections to a steering mechanism to steer wheels of the vehicle, and an adjustment mechanism for adjusting the position of the steering wheel in a vehicle relative to a driver of the vehicle, including a telescope adjustment mechanism for performing a telescope adjustment to adjust the overall length of the column and a tilt adjustment mechanism for performing a tilt adjustment to adjust inclination of the steering wheel. The telescope adjustment mechanism comprises an electric-motor-operated linear actuator for setting the extent of relative telescopic engagement of two shaft sections, and the tilt adjustment mechanism comprises an electric-motor-operated linear actuator for tilting the steering wheel on one of the two shaft sections about a tilt axis.

The foregoing, along with further features and advantages of the invention, will be seen in the following disclosure of a presently preferred embodiment of the invention depicting the best mode contemplated at this time for carrying out the invention. The disclosure includes drawings briefly described as follows.

BRIEF DESCRIPTION OF THE DRAWINGS

FIG. 1 is a side elevation view of a portion of a steering column relevant to principles of the present invention.

FIG. 2 is an enlarged fragmentary view in the direction of arrow 2 in FIG. 1.

FIG. 3 is a block diagram relevant to principles of the present invention.

DESCRIPTION OF THE PREFERRED EMBODIMENT

FIG. 1 shows exemplary mechanism of a representative adjustable automotive vehicle steering column 10 comprising a steering wheel 12 at one end. The opposite end is coupled to a steering mechanism 14 that steers wheels 16 of the vehicle, such as right and left front wheels, in unison to steer the vehicle as it is being driven. An example of a steering mechanism comprises a steering gear and linkages from the steering gear to the wheels, although principles of the present invention are independent of specific details of steering mechanism 14. As steering wheel 12 turns about a main longitudinal axis 18 of steering column 10, steering mechanism 14 is operated to steer wheels 16 in a direction corresponding to the extent to which steering wheel 12 is being turned.

The mechanism of steering column 10 includes a shaft 20 comprising telescoping shaft sections 20A, 20B that telescope together at a slip joint 20C and a tilt section 20D that tilts with respect to shaft section 20B about a generally horizontal, transverse axis, or tilt pivot, 20E at an end of shaft section 20B opposite slip joint 20C. Slip joint 20C allows shaft sections 20A, 20B to telescope, thereby changing the effective length of the steering column, while keeping the two sections rotatably coupled. Tilt pivot 20E allows steering wheel 12 to tilt about the end of shaft section 20B, thereby changing the steering wheel inclination.

In accordance with certain principles of the invention, steering column further comprises a telescope actuator 22 and a tilt actuator 24. Actuators 22, 24 are motorized devices, with each comprising, in this exemplary embodiment, a respective electric motor 26, 28 that contains a mechanism, such as a screw and nut mechanism, for imparting lengthwise motion to a respective actuator shaft 30, 32.

Motor 26 of telescope actuator 22 is disposed on a stationary mount 34 on shaft section 20A to dispose actuator shaft 30 parallel to axis 18 and spaced from shaft sections 20A, 20B. An attachment 34A attaches an end of actuator shaft 30 to shaft section 20B. As motor 26 operates, it turns the nut of the screw and nut mechanism to move actuator shaft 30 lengthwise relative to stationary mount 34, thereby causing actuator shaft 30 to move shaft section 20B relative to shaft section 20A. Rotation of motor 26 in one direction decreases the overall length of the steering column, and in the opposite direction, increases the overall length. Because steering column 10 is disposed generally fore and aft in the vehicle, operation of actuator 22 is effective to position steering wheel 12 in a fore-aft direction relative to the driver because the tilt pivot 20E moves along axis 18 with shaft section 20B.

Motor 28 of tilt actuator 24 is disposed on a stationary mount 36 on shaft section 20B to dispose actuator shaft 32 generally parallel to axis 18 and spaced from shaft sections 20A, 20B on the opposite side of the column from actuator shaft 30. An attachment 38 attaches an end of actuator shaft 32 to shaft section 20D. As motor 28 operates, it turns the nut of the screw and nut mechanism to move actuator shaft 32 lengthwise relative to stationary mount 36. The shaft will act to tilt steering wheel 12 about tilt pivot 20E, and so to allow for this, motor 28 is arranged on mount 36 to rock about a transverse axis as shaft 32 moves. Rotation of motor 28 in one direction increases the steering wheel tilt, and in the opposite direction, decreases the steering wheel tilt.

In accordance with further principles of the invention, as depicted by FIG. 3, operation of actuators 22, 24 is controlled by a controller 40. A tilt sensor 42 and a telescope sensor 44 are associated with steering column 10 and provide inputs to controller 40. An activation button 46, shown in FIG. 2 mounted in a spoke of steering wheel 12 proximate the rim, operates a switch that comprises a further input to controller 40.

Each sensor 42, 44 is disposed in a respective location of steering column 10 to sense certain force inputs applied to steering wheel 12 by the driver. Telescope sensor 44 is disposed to sense force applied along axis 18, and tilt sensor 42, to sense force applied about tilt pivot 20E. Each sensor possesses bi-directional sensing capability. In other words, telescope sensor 44 can sense both pushing and pulling forces on steering wheel 12, and tilt sensor 42 can sense both increasing-tilt and decreasing-tilt forces on steering wheel 12.

The application of any such forces to steering wheel 12 will not be effective to adjust the steering wheel position unless controller 40 is operated to an adjustment mode. The adjustment mode is invoked by actuation of activation button 46, causing the associated switch to signal controller 40. Controller 40 becomes effective to operate one or both actuators 22, 24 in accordance with force applied to steering wheel 12, as sensed by sensors 42, 44. Specifically, tilt actuator 24 operates in response to tilt adjustment force sensed by tilt sensor 42, and telescope actuator 22, in response to telescope adjustment force sensed by telescope sensor 44. Tilt adjustment force is depicted by the double-headed arrow 48 in FIG. 1, and telescope adjustment force, by the double-headed arrow 50.

Sensor 42, controller 40, and actuator 24 form a tilt force feedback system, with sensor 42 and controller 40 being a feedback system for feedback control of actuator 24. Sensor 42 senses tilt adjustment force externally applied to steering wheel 12 by the driver during adjustment of the steering wheel position, and controller 40 responds by operating actuator 24 to tilt the steering wheel in a direction of adjustment corresponding to the direction of external tilt adjustment force applied to the steering wheel by the driver. The force feedback system is arranged to terminate further tilting when the externally applied force causing the tilting movement ceases, or should the actuator reach a travel limit.

So long as the adjustment mode is in effect, the actuator will respond in this manner.

Sensor 44, controller 40, and actuator 22 form a telescope force feedback system, with sensor 44 and controller 40 being a feedback system for feedback control of actuator 22. Sensor 44 senses telescope adjustment force externally applied to steering wheel 12 by the driver during adjustment of the steering wheel position, and controller 40 responds by operating actuator 22 to telescope the steering wheel in a direction of adjustment corresponding to the direction of external telescope adjustment force applied to the steering wheel by the driver. The force feedback system is arranged to terminate further telescoping when the externally applied force causing the telescoping movement ceases, or should the actuator reach a travel limit. So long as the adjustment mode is in effect, the actuator will respond in this manner.

When a driver desires to adjust the position of steering wheel 12, he may grasp opposite sides of the steering wheel rim with the hands, as if steering the vehicle, and depress activation button 46 with the thumb of the left hand. He may then urge the steering wheel toward a desired position of adjustment, using tilt and/or telescope components of force. Controller 40 acts upon components of force sensed by either or both sensors 42, 44 to operate either or both actuators 22, 24 and in turn cause the tilt and/or telescope adjustment mechanisms to adjust the steering wheel toward the position toward which it is being urged by the driver. The response of the controller and actuators is sufficiently fast that the driver perceives that he is freely moving the steering wheel with virtually no effort at all. Although there are two discrete actuators for imparting different components of adjustment motion, the system imparts a feeling of fluid motion even when both actuators are operating, and that allows the driver to concentrate on a desired adjustment motion without conscious regard for its two independent components, i.e. tilt and telescope, although a driver may choose to do one motion and then the other. When a desired position of adjustment has been reached, the adjustment mode is discontinued by releasing activation button 46, with the steering wheel remaining in adjusted position until the adjustment mode is once again invoked by depressing the activation button.

Each force feedback system is an electromechanical servo system that strives to null a force input sensed by a respective sensor. Various forms of actuators and sensors are believed suitable in practice of the invention. An actuator may comprise a D.C. motor for turning the internal nut that operates the screw that moves the actuator shaft. Controller 40 may comprise a microprocessor that operates each actuator motor via a suitable interface circuit. A sensor may comprise a strain gauge, a pressure sensor, or a contact switch, and may be located in any suitable location, such as the steering wheel rim, a steering wheel spoke, or the steering wheel hub, for example, or in the actuator itself. Electric connections to the steering column may be made in any conventional manner, such as using clock springs or slip rings.

It is believed that an adjustment system that embodies principles of the invention is especially driver-friendly because it is push-button activated, is adjusted using two-hand gripping of the wheel that is commonly done when steering the vehicle, and gives a feeling of fluid adjustment motion. It is believed useful in vehicles that may have different drivers from time to time, such as a highway or delivery truck that is part of a truck fleet.

While a presently preferred embodiment of the invention has been illustrated and described, it should be appreciated that principles of the invention are applicable to all embodiments that fall within the scope of the following claims.

What is claimed is:

1. An automotive vehicle steering column and adjustment system comprising:
    a steering column, including a steering wheel whose motion is transmitted through the steering column to a steering mechanism to steer wheels of a vehicle;
    an adjustment mechanism for adjusting the position of the steering wheel in the vehicle relative to a driver of the vehicle, including an actuator for performing the adjustment;
    and a system for operating the actuator, including a sensor for sensing an adjustment force externally applied to the steering wheel by a driver during adjustment of the steering wheel position, and a controller that is responsive to the sensor for causing the actuator to move the steering wheel in the direction of the externally applied force and to terminate further movement when the externally applied force causing the movement ceases;
    including an adjustment activation input disposed for actuation by the driver and operatively connected to the controller to initiate a steering wheel position adjustment.

2. An automotive vehicle steering column and adjustment system as set forth in claim 1 in which the adjustment mechanism comprises a tilt adjustment for tilting the steering wheel by adjusting the angle of inclination of the steering wheel relative to the driver, the sensor is responsive to tilt adjustment force that is externally applied to tilt the steering wheel, and the actuator is arranged to tilt the steering wheel.

3. An automotive vehicle steering column and adjustment system as set forth in claim 1 in which the adjustment mechanism comprises a telescope adjustment for adjusting the position of the steering wheel in a fore-aft direction relative to the driver, the sensor is responsive to adjustment force that is externally applied to the steering wheel in the fore-aft direction, and the actuator is arranged to move the steering wheel in the fore-aft direction.

4. An automotive vehicle steering column and adjustment system as set forth in claim 3 further including a second adjustment mechanism that comprises a tilt adjustment, including a second actuator, for tilting the steering wheel by adjusting the angle of inclination of the steering wheel relative to the driver, and a second sensor that is responsive to tilt adjustment force that is externally applied to tilt the steering wheel, in which the second actuator is arranged to tilt the steering wheel, and in which the controller is responsive to the second sensor for operating the second actuator to tilt the steering wheel in a direction corresponding to the direction of external force applied to tilt the steering wheel.

5. An automotive vehicle steering column and adjustment system as set forth in claim 1 in which the adjustment activation input comprises a button disposed on the steering wheel proximate a rim of the steering wheel to be pushed by a driver's thumb while grasping the rim proximate the button.

6. An automotive vehicle steering column and adjustment system as set forth in claim 5 in which the button is disposed in a spoke of the steering wheel inward of the rim.

7. A system for adjusting the position of a steering wheel in an automotive vehicle comprising:
    an adjustment mechanism for adjusting the position of the steering wheel in the vehicle relative to a driver of the vehicle, including an actuator for performing the adjustment;

and a force feedback system for operating the actuator, including a sensor for sensing an adjustment force externally applied to the steering wheel by the driver during adjustment of the steering wheel position, and a controller that is responsive to the sensor for operating the actuator to position the steering wheel in a direction of adjustment corresponding to the direction of external force applied to the steering wheel by the driver;

including an adjustment activation input disposed for actuation by the driver and operatively connected to the controller to initiate a steering wheel position adjustment.

8. A system as set forth in claim 7 in which the adjustment mechanism comprises a tilt adjustment for tilting the steering wheel by adjusting the angle of inclination of the steering wheel relative to the driver,he sensor is responsive to tilt adjustment force that is externally applied to tilt the steering wheel, and the actuator is arranged to tilt the steering wheel.

9. A system as set forth in claim 7 in which the adjustment mechanism comprises a telescope adjustment for adjusting the position of the steering wheel in a fore-aft direction relative to the driver, the sensor is responsive to adjustment force that is externally applied to the steering wheel in the fore-aft direction, and the actuator is arranged to move the steering wheel in the fore-aft direction.

10. An automotive vehicle steering column and adjustment system as set forth in claim 9 further including a second adjustment mechanism that comprises a tilt adjustment, including a second actuator, for tilting the steering wheel by adjusting the angle of inclination of the steering wheel relative to the driver, and a second sensor that is responsive to tilt adjustment force that is externally applied to tilt the steering wheel, in which the second actuator is arranged to tilt the steering wheel, and in which the controller is responsive to the second sensor for operating the second actuator to tilt the steering wheel in a direction corresponding to the direction of external force applied to tilt the steering wheel.

11. A system as set forth in claim 7 in which the force feedback system is arranged to terminate further movement when the externally applied force causing the movement ceases.

12. A system as set forth in claim 7 in which the adjustment activation input comprises a button disposed in a spoke of the steering wheel inward of the rim.

13. A system as set forth in claim 7 in which the actuator comprises an actuator shaft and an electric motor for imparting lengthwise motion to the actuator shaft to perform the adjustment.

14. A system for adjusting the position of a steering wheel in an automotive vehicle comprising:

an adjustment mechanism for adjusting the position of the steering wheel in a vehicle relative to a driver of the vehicle, including an actuator for performing the adjustment;

and a system for operating the actuator, including a sensor for sensing an adjustment force externally applied to the steering wheel by the driver during adjustment of the steering wheel position, and a controller that is responsive to the sensor for causing the actuator to move the steering wheel in the direction of the externally applied force and to terminate further movement when the externally applied force causing the movement ceases; including an adjustment activation input disposed for actuation by the driver and operatively connected to the controller to initiate a steering wheel position adjustment.

15. A system as set forth in claim 14 in which the adjustment mechanism comprises a tilt adjustment for tilting the steering wheel by adjusting the angle of inclination of the steering wheel relative to the driver, the sensor is responsive to tilt adjustment force that is externally applied to tilt the steering wheel, and the actuator is arranged to tilt the steering wheel.

16. A system as set forth in claim 14 in which the adjustment mechanism comprises a telescope adjustment for adjusting the position of the steering wheel in a fore-aft direction relative to the driver, the sensor is responsive to adjustment force that is externally applied to the steering wheel in the fore-aft direction, and the actuator is arranged to move the steering wheel in the fore-aft direction.

17. A system as set forth in claim 16 further including a second adjustment mechanism that comprises a tilt adjustment, including a second actuator, for tilting the steering wheel by adjusting the angle of inclination of the steering wheel relative to the driver, and a second sensor that is responsive to tilt adjustment force that is externally applied to tilt the steering wheel, in which the second actuator is arranged to tilt the steering wheel, and in which the controller is responsive to the second sensor for operating the second actuator to tilt the steering wheel in a direction corresponding to the direction of external force applied to tilt the steering wheel.

18. A system as set forth in claim 14 in which the adjustment activation input comprises a button disposed in a spoke of the steering wheel inward of the rim.

19. A system as set forth in claim 14 in which the actuator comprises an actuator shaft and an electric motor for imparting lengthwise motion to the actuator shaft to perform the adjustment.

* * * * *